(12) United States Patent
Kelley et al.

(10) Patent No.: US 7,171,499 B2
(45) Date of Patent: Jan. 30, 2007

(54) PROCESSOR SURROGATE FOR USE IN MULTIPROCESSOR SYSTEMS AND MULTIPROCESSOR SYSTEM USING SAME

(75) Inventors: Brent Kelley, Round Rock, TX (US); William C. Brantley, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 371 days.

(21) Appl. No.: 10/683,859

(22) Filed: Oct. 10, 2003

(65) Prior Publication Data

US 2005/0080978 A1  Apr. 14, 2005

(51) Int. Cl.
  *G06F 13/40* (2006.01)
  *G06F 13/00* (2006.01)
  *G06F 15/80* (2006.01)
  *G06F 13/36* (2006.01)

(52) U.S. Cl. .................. 710/104; 710/300; 710/301; 712/11

(58) Field of Classification Search ............... None
See application file for complete search history.

(56) References Cited

U.S. PATENT DOCUMENTS

| | | | |
|---|---|---|---|
| 4,014,005 A | | 3/1977 | Fox et al. |
| 5,297,272 A | | 3/1994 | Lu et al. |
| 5,455,927 A | | 10/1995 | Huang |
| 5,828,869 A | | 10/1998 | Johnson et al. |
| 6,128,685 A | * | 10/2000 | Cronin ................. 710/301 |
| 6,553,430 B1 | * | 4/2003 | Keller ................. 710/5 |
| 6,626,690 B2 | * | 9/2003 | Homer et al. ........... 439/218 |
| 6,633,960 B1 | * | 10/2003 | Kessler et al. .......... 711/144 |
| 6,651,131 B1 | * | 11/2003 | Chong et al. ........... 710/317 |
| 6,675,265 B2 | * | 1/2004 | Barroso et al. .......... 711/141 |
| 6,766,577 B2 | * | 7/2004 | Homer et al. ........... 29/854 |
| 6,874,070 B2 | * | 3/2005 | Gupta et al. ............ 711/157 |
| 6,944,719 B2 | * | 9/2005 | Rowlands et al. ........ 711/141 |
| 7,007,125 B2 | * | 2/2006 | Barker et al. ........... 710/301 |
| 2002/0087807 A1 | * | 7/2002 | Gharachorloo et al. .... 711/141 |

(Continued)

OTHER PUBLICATIONS

HyperTransport™ I/O Link Specification, Revision 1.05, © 2003 HyperTransport Technology Consortium.

(Continued)

*Primary Examiner*—Rehana Perveen
*Assistant Examiner*—Ryan M. Stiglic
(74) *Attorney, Agent, or Firm*—Larson Newman Abel Polansky & White, LLP

(57) ABSTRACT

A processor surrogate (320/520) is adapted for use in a processing node (S1) of a multiprocessor data processing system (300/500) having a plurality of processing nodes (P0, S1) coupled together and to a plurality of input/output devices (330, 340, 350/530, 540, 550, 560) using corresponding communication links. The processor surrogate (320/520) includes a first port (372, 374/620, 622) comprising a first set of integrated circuit terminals adapted to be coupled to a first external communication link (370/590) for coupling (P0) of the plurality of processing nodes (310, 320/510, 520), a second port (382, 384/630, 632) comprising a second set of integrated circuit terminals adapted to be coupled to a second external communication link (380/592) for coupling to one (350/550) of the plurality of input/output devices (330, 340, 350/530, 540, 550, 560), and an interconnection circuit (390, 392/608, 612, 614) coupled between the first port (372, 374/620, 622) and the second port (382, 384/630, 632).

32 Claims, 6 Drawing Sheets

U.S. PATENT DOCUMENTS

2004/0093404 A1* 5/2004 Snyder et al. .............. 709/223
2004/0236891 A1* 11/2004 Arimilli et al. ............. 710/306
2004/0268000 A1* 12/2004 Barker et al. ............... 710/301
2005/0053057 A1* 3/2005 Deneroff et al. ............ 370/360
2005/0243531 A1* 11/2005 Kulpa et al. ................ 361/783
2006/0080484 A1* 4/2006 Lefebvre et al. ............ 710/104

OTHER PUBLICATIONS

"The AMD Opteron Processor for Multiprocessor Servers," Chetana N. Keltcher et al., IEEE, 2003, pp. 66-76.

* cited by examiner

US 7,171,499 B2

PROCESSOR SURROGATE FOR USE IN MULTIPROCESSOR SYSTEMS AND MULTIPROCESSOR SYSTEM USING SAME

TECHNICAL FIELD

The present invention generally relates to data processing systems, and more particularly relates to multiprocessor systems.

BACKGROUND

Over the history of digital computers there has been a continuous trend toward higher performance. Recent advances in integrated circuit (IC) manufacturing technology have produced smaller and faster ICs such that current microprocessor-based computer systems have higher performance that supercomputers of a generation ago. Microprocessor performance is determined by many factors, including clock speed and data bus width.

Typically IC manufacturers have been able to offer higher speed versions of a particular microprocessor over its lifetime. The continual improvement in microprocessor speed has created the opportunity for users to upgrade their computer systems with newer, higher speed microprocessors. Thus an older, slower microprocessor could be unplugged from its socket and a new, higher speed microprocessor inserted in its place. An example of this type of upgradeability is a microprocessor that can communicate with a memory device at one speed but whose internal clock speed can be scaled to a higher frequency, as disclosed in U.S. Pat. No. 5,828,869 to Johnson et al.

This type of upgrading has allowed significant performance increases in single processor systems. However recent computer architectures have become more complex than single processor systems. For example some computer architectures now use multiple processors and non-uniform memory accessing (NUMA). In such NUMA systems, two or more microprocessors are connected in a ring or network and each have associated memory and possibly one or more associated input/output devices. It would be desirable for users to begin with a low-cost NUMA system and upgrade the system to improve performance later.

Accordingly, it would be desirable to provide a new means of upgrading performance in multiprocessor computer systems. This and other desirable features and characteristics of the present invention will become apparent from the subsequent detailed description and the appended claims, taken in conjunction with the accompanying drawings and the foregoing technical field and background.

BRIEF SUMMARY

A processor surrogate is adapted for use in a processing node of a multiprocessor data processing system having a plurality of processing nodes coupled together and to a plurality of input/output devices using corresponding communication links. The processor surrogate includes a first port comprising a first set of integrated circuit terminals adapted to be coupled to a first external communication link for coupling to one of the plurality of processing nodes, a second port comprising a second set of integrated circuit terminals adapted to be coupled to a second external communication link for coupling to one of the plurality of input/output devices, and an interconnection circuit coupled between the first port and the second port.

In another form a multiprocessor data processing system includes first and second processing nodes and an input/output device. The first processing node includes an actual processor. The second processing node includes a processor surrogate. The processor surrogate has a first port coupled to the first processing node, a second port, and an interconnection circuit coupled between the first port and the second port. The input/output device is coupled to the second port of the second processing node and is accessible to the actual processor via the processor surrogate.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
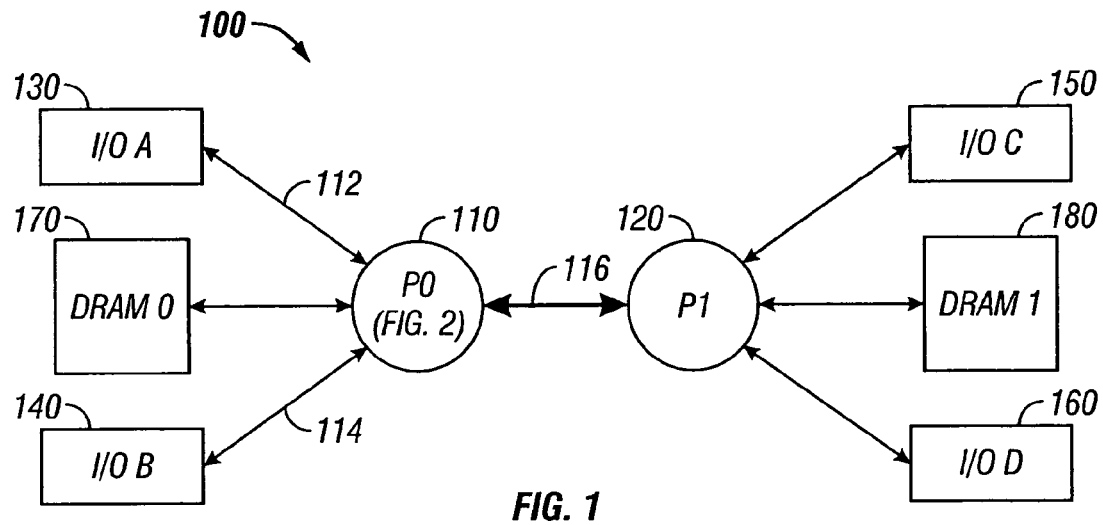
FIG. 1 illustrates a block diagram of a multiprocessor computer system useful in understanding the present invention.

FIG. 1 illustrates a block diagram of a multiprocessor computer system 100 useful in understanding the present invention. Computer system 100 includes two processor nodes represented by circles including a first processor node labeled "P0" and a second processor node labeled "P1" connected together over a communication link 116. Nodes P0 and P1 are implemented using microprocessors 110 and 120, respectively. System 100 also includes a first input/output (I/O) device 130 labeled "I/O A", a second I/O device 140 labeled "I/O B", a third I/O device 150 labeled "I/O C", a fourth I/O device 160 labeled "I/O D", a first dynamic random access memory (DRAM) 170 labeled "DRAM 0", and a second DRAM 180 labeled "DRAM 1". Processor 110 is a single-chip microprocessor that communicates with I/O devices 130 and 140 over communication links 112 and 114, respectively, and with processor 120 over link 116. Processor 110 also has a dedicated bus for performing memory accesses with local DRAM 170. Likewise processor 120 communicates with I/O devices 150 and 160 over corresponding links and has a dedicated bus for connection to local DRAM 180. I/O devices 130, 140, 150, and 160 may be any of a variety of I/O devices including a graphics processor, an Ethernet controller, a bridge to another bus such as that specified by the Personal Computer Interconnect (PCI) Special Interest Group, etc.

Processors 110 and 120 communicate with their respective I/O devices using link controllers complying with the HyperTransport™ I/O Link Specification, Revision 1.05, © 2003 HyperTransport Technology Consortium, and are able to achieve a throughput of 3.2 GB/sec when using a 1600 MHz data rate. HyperTransport technology is a packet-based link implemented on two independent unidirectional sets of wires. So for example links 112, 114, and 116 include both an output connection and an input connection. Each HyperTransport link is nominally point-to-point and connects two devices. Chains of HyperTransport links can also be used as an I/O channel, connecting I/O devices and bridges to a host system. The HyperTransport link is designed to deliver a high-performance and scalable interconnect between CPU, memory, and I/O devices. The HyperTransport link uses low swing differential signaling with on-die differential termination to achieve very high data rates. The HyperTransport link uses scalable frequency and data width to achieve scalable bandwidth.

System 100 includes memory associated with each processor node and distributed among the nodes. It implements a cache coherent non-uniform memory access ("CC NUMA") architecture. The CC NUMA architecture is non-uniform in that all memory in the system is visible to each processor, but access time depends on the physical distance between the processor and the memory. Thus processor 110 is able to access DRAM 170 quickly, but must wait while the memory access request travels over link 116 before it can access DRAM 180. Link 116 between processors 110 and 120 uses a special form of HyperTransport known as coherent HyperTransport.

Figure 2:
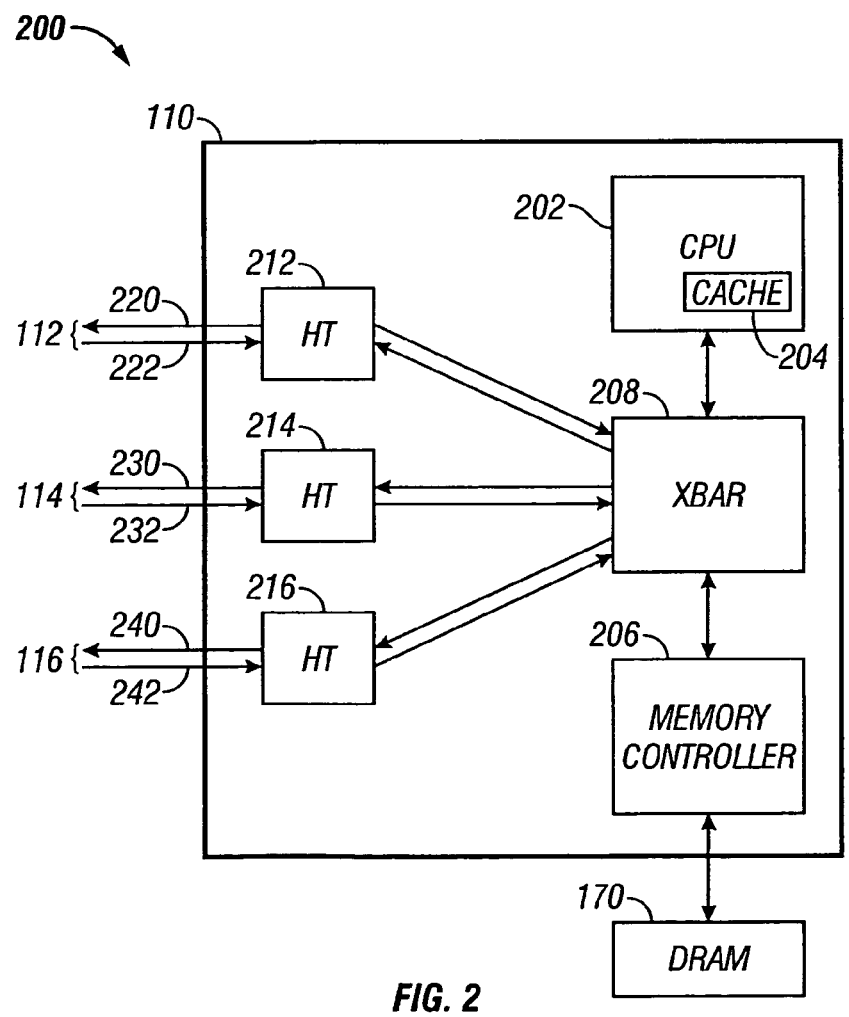
FIG. 2 illustrates a block diagram of a portion of the multiprocessor computer system of FIG. 1 including one of the processors and its associated memory.

FIG. 2 illustrates a block diagram of a portion 200 of multiprocessor computer system 100 of FIG. 1, including processor 110 and DRAM 170. Processor 110 is a single-chip microprocessor and includes generally a central processing unit (CPU) 202, a memory controller 206, a crossbar switch labeled "XBAR" 208, and three link controllers 212, 214, and 216 each labeled "HT" for HyperTransport. CPU 202 is a processor adapted to execute instructions of the so-called x86 instruction set. The x86 instruction set is based on the instruction set of the 8086 microprocessor first manufactured by the Intel Corporation of Santa Clara, Calif. CPU 202 however includes many sophisticated functions for high-performance execution of x86 programs including pipelining and superscalar design. CPU 202 includes at least one cache 204 for storage of frequently used data. For example CPU 202 may include two top level (L1) caches, one for instructions and the other one for data, and a second level (L2) cache that is shared by the instruction and data streams.

Memory controller 206 is the mechanism for data transfer between processor 110 and DRAM 170. Memory controller 206 offloads the task of initiating and terminating memory accesses from CPU 202. It includes internal queues to allow efficient use of the external bus to DRAM 170. In other embodiments DRAM 170 could be replaced by a lower-level memory system including one or more additional caches and main memory, by static RAM, by nonvolatile memory, etc.

XBAR 208 is a switching/multiplexing circuit designed to couple together the buses internal to processor 110.

Link controllers 212, 214, and 216 are coupled to external links 112, 114, and 116, respectively. Links 112, 114, and 116 include output channels 220, 230, and 240, respectively, and input channels 222, 232, and 242, respectively. Each of link controllers 212, 214, and 216 comply with the HyperTransport™ I/O Link Specification, Revision 1.05, but additionally support the special coherent form of HyperTransport which is able to link two processor nodes.

Considering now FIGS. 1 and 2 together, it can be seen how processor 120 is able to access DRAM 170. Processor 120's own memory controller, corresponding to memory controller 206, would receive a memory access request from its CPU. Upon recognizing that the access is for memory present at another node, it would send a memory access request to processor 110 through one of its link controllers over coherent link 116. The request packet would be received by link controller 216 and routed through XBAR 208 to memory controller 206. Memory controller 206 would then check its internal directory to see whether the requested memory element is present in cache 204. If the requested memory element were absent from cache 204, memory controller 206 would read DRAM 170 and provide the requested data element through XBAR 208 and link controller 216 over coherent link 116 back to processor 120.

Figure 3:
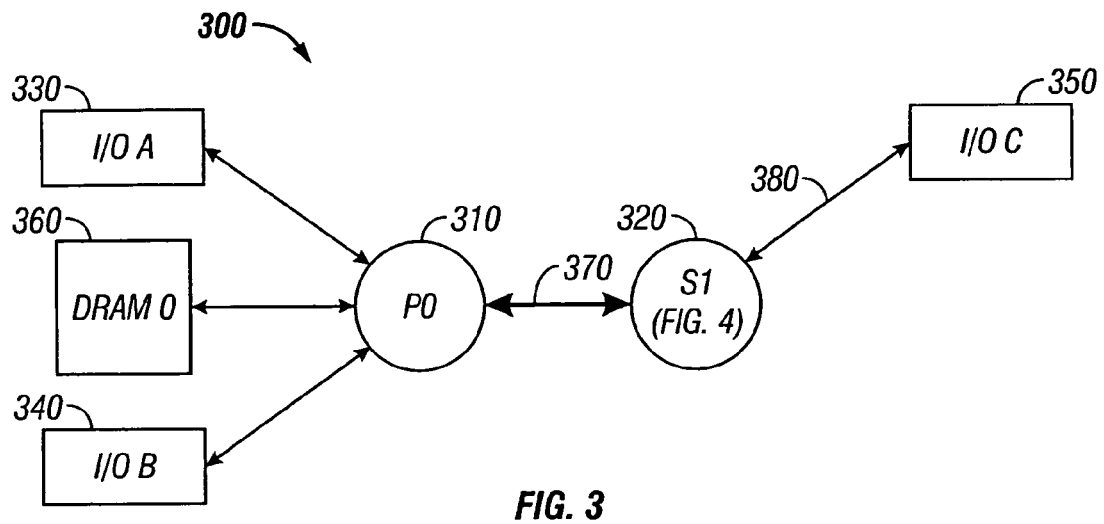
FIG. 3 illustrates a block diagram of a multiprocessor computer system using a processor surrogate according to the present invention.

While it is possible to upgrade system 100 using socket-compatible but higher speed processors, more flexible upgrade capabilities would be desirable. Such a capability is shown in FIG. 3, which illustrates a block diagram of a multiprocessor computer system 300 using a processor surrogate 320 according to the present invention. As used herein "multiprocessor" means having more than one processing node, even though only one processing node may have an actual CPU. System 300 is similar to system 100 except that node P1 has been replaced by a node labeled "S1" having processor surrogate 320 that does not have its own CPU. As used herein, a "processor surrogate" is a device that plugs into the socket of node S1 and is used in place of an actual processor. By using processor surrogate 320 in place of an actual processor, an extra I/O device 350 is available for use in system 300, but without the expense of another actual microprocessor having its own CPU. System 300 is essentially a single-processor system that may be easily upgraded to a dual processor system. Thus system 300 is a lower cost system but has an upgrade path: an actual processor like that described with respect to FIG. 2 could later be inserted into the socket used by processor surrogate 320 to upgrade significantly the performance of computer system 300.

Figure 4:
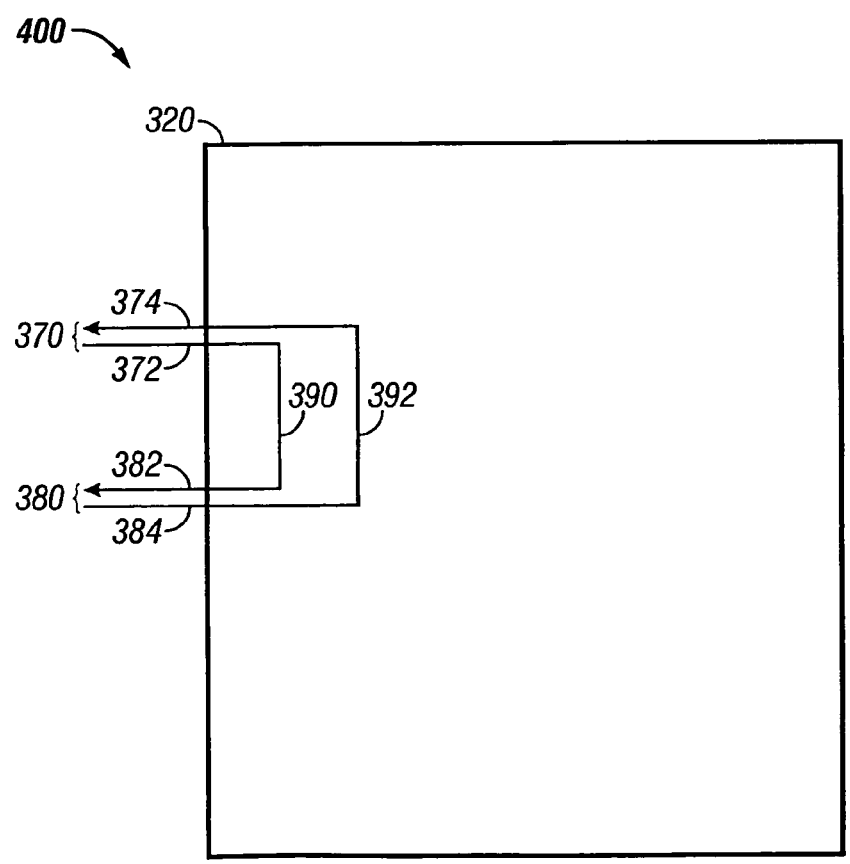
FIG. 4 illustrates in a block diagram of the processor surrogate of FIG. 3.

As will be seen hereinafter, a processor surrogate can be of two general types: active and passive. Both types of processor surrogates are socket compatible with and operate in place of an actual microprocessor but they differ in the type of interconnection circuit used. FIG. 4 illustrates a block diagram of processor surrogate 320 of FIG. 3. Processor surrogate 320 is a passive type surrogate and includes a first set of wires 390 to connect input signals of HyperTransport link 370 to output signals of HyperTransport link 380, and a second set of wires 392 to connect input signals of HyperTransport link 380 to output signals of HyperTransport link 370. Processor surrogate 320 includes integrated circuit terminals, corresponding to terminals of two link controllers of an actual microprocessor, such as microprocessor 110 of FIG. 2.

On power-up, processor 310 detects whether the HyperTransport link is coherent or non-coherent and negotiates the speed of information transfer over the link. Thus the link controller in processor 310 connected to link 370 will detect, from communication with I/O controller 350 via processor surrogate 320, that the link is to be non-coherent. However if the processor surrogate were later replaced with an actual processor, then the link controller in processor 310 would detect the presence of an active node and configure it to be a coherent link.

Processor surrogate 320 has the same "footprint" as processor 110 of FIGS. 1 and 2, i.e. it is physically capable of plugging or being inserted into a socket that accommodates an actual processor like processor 110. Thus it would have the same integrated circuit package dimensions as an actual processor. However the integrated circuit package would only contain wires 390 and 392. In particular one type of package used for processor 110 is a package known as a ceramic micro pin grid array. To accommodate a socket for a micro pin grid array processor, processor surrogate 320 would also use a similar micro pin grid array package. However the pins for most signals would not be connected, and thus would exist as "dummy" pins. Pins 372, 374, 382, and 384 would be used to provide the appropriate interconnections. A ceramic type package provides the opportunity for forming interconnections using multiple signal planes within the ceramic material to reduce parasitic losses that would otherwise occur through the use of bond wires if a leadframe type package were used. Power and ground pins may optionally be connected to provide suitable ground planes for signal shielding from RF radiation and interference. Note that processor surrogate 320 may be redesigned to match the footprint of any other package type used for the actual processor. Also it would be possible to substitute a cheaper organic package for the ceramic package if the electrical and mechanical properties were sufficient.

More specifically, processor surrogate 320 may be housed in a ceramic micro pin grid array package having a total of 961 available pins formed as an array of 31 rows by 31 columns. Using HyperTransport links, input ports 372 and 384 each include thirty eight pins, including four clock input pins, two control input pins, and thirty two multiplexed command/address/data input pins, wherein each signal is conducted differentially using a pair of signal pins. Output ports 374 and 384 also include thirty eight corresponding pins, including four clock output pins, two control output pins, and thirty two multiplexed command/address/data output pins. To make processor surrogate 320, one would form internal interconnections 390 within the package of processor surrogate 320 by connecting the control input pins of the first link (link 0) and the control output pins of the second link (link 1), the clock input pins of link 0 and the corresponding clock output pins of link 1, and the multiplexed command/address/data input pins of link 0 and the corresponding multiplexed command/address/data output pins of link 1. Similar connections 392 would be made for connecting the inputs of link 1 to the outputs of link 0. Note that a feature of HyperTransport is the ability to scale the number of command/address/data pins from two to thirty-two pairs of pins, and in other embodiments a different number of command/address/data pins besides the sixteen pairs of differential pins described above may be supported.

Figure 5:
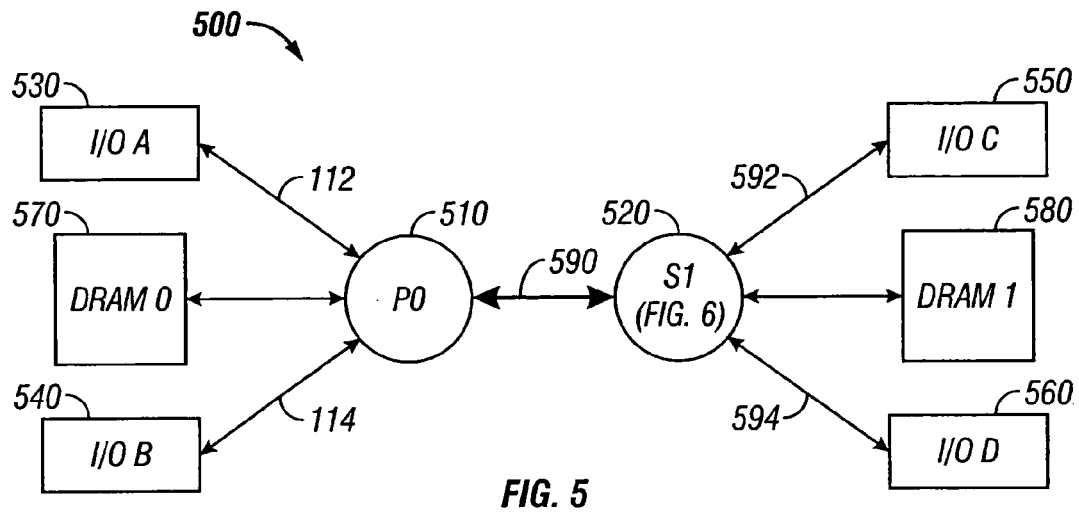
FIG. 5 illustrates a block diagram of a multiprocessor computer system using a processor surrogate according to another aspect of the present invention.

FIG. 5 illustrates a block diagram of a multiprocessor computer system 500 using a processor surrogate according to another aspect of the present invention. System 500 includes an actual processor 510 in node P0 and an active form of a processor surrogate 520 in node S1. Nodes P0 and S1 are connected together using a coherent HyperTransport link 590. System 500 includes four I/O devices, including an I/O device 530 labeled "I/O A", an I/O device 540 labeled "I/O B", an I/O device 550 labeled "I/O C", and an I/O device 560 labeled "I/O D". I/O devices 530 and 540 are connected to processor 510 using respective non-coherent HyperTransport links, and I/O devices 550 and 560 are connected to processor surrogate 520 using respective non-coherent HyperTransport links 592 and 594. System 500 also includes a first DRAM 570 labeled "DRAM 0", and a second DRAM 580 labeled "DRAM 1", connected respectively to nodes P0 and S1.

System 500 uses active processor surrogate 520 to allow more resources to be available to node P0 but without the need for a second actual processor having its own CPU and cache. As will be described further below processor surrogate 520 provides interconnection by active circuitry instead of simple wiring to allow processor 510 to access two I/O devices 550 and 560 and an extra DRAM 580 without needing an additional CPU. Since it lacks the CPU and cache, processor surrogate 520 is cheaper than an actual processor but provides an upgrade path for future performance enhancement.

Figure 6:
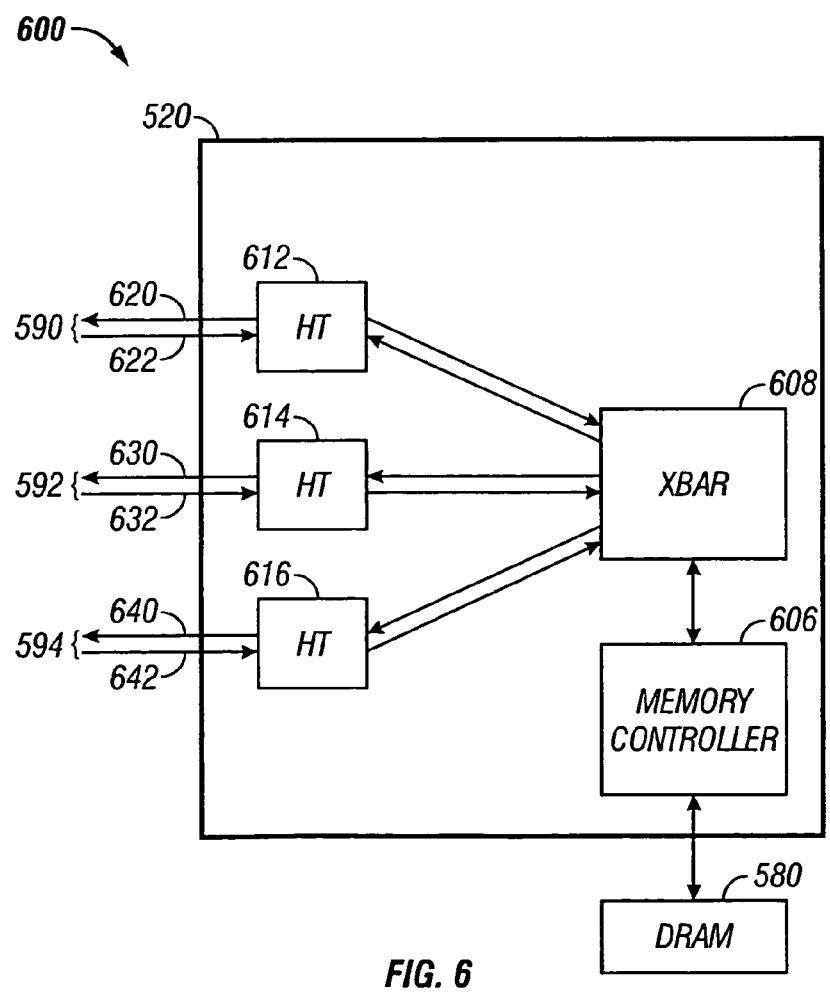
FIG. 6 illustrates a block diagram of the processor surrogate of FIG. 5.

The construction of an active processor surrogate is better understood with respect to FIG. 6, which illustrates a block diagram of a portion of system 500 of FIG. 5 including processor surrogate 520 and DRAM 580. As shown in FIG. 6, processor surrogate 520 includes a memory controller 606, a crossbar switch 608, and HyperTransport link controllers 612, 614, and 616 connected respectively to links 590, 592, and 594. As in processor 110 of FIG. 2, HyperTransport link controllers 612, 614, and 616 are connected to corresponding ports including sets of output connections 620, 630, and 640 and sets of input connections 622, 632, and 634, respectively. HyperTransport link controllers 612, 614, and 616 are also connected to crossbar switch 608. Memory controller 606 is connected to crossbar switch 608 and to external DRAM 580.

The memory controllers, crossbar switches, and HyperTransport link controllers of both actual processor 110 of FIG. 2 and processor surrogate 520 are functionally identical. In the illustrated form crossbar switches 208 and 608 both include a feature to automatically detect the presence or absence of the CPU. Thus the design is modular and the integrated circuit used in processor surrogate 520 can be realized by simply deleting the CPU from the netlist and inputting the modified netlist to automated place and route CAD software. Since the CPU consumes a substantial majority of the integrated circuit area of processor 110, the integrated circuit used in processor surrogate 520 will be significantly less expensive. Alternatively the active processor surrogate could be formed using an actual processor with a defective CPU.

Note that for use with an active processor surrogate, link 590 uses the coherent form of HyperTransport. Like the memory controller, the link controllers in processor surrogate 520 are modular and are the same as those used in an actual processor. However on power up the link controller in processor surrogate 520 connected to processor 510 over link 590 detects an active device on the other end and configures the link into the coherent form of HyperTransport. Thus the protocol is appropriate for a surrogate with its own distributed memory and memory controller.

Figure 7:
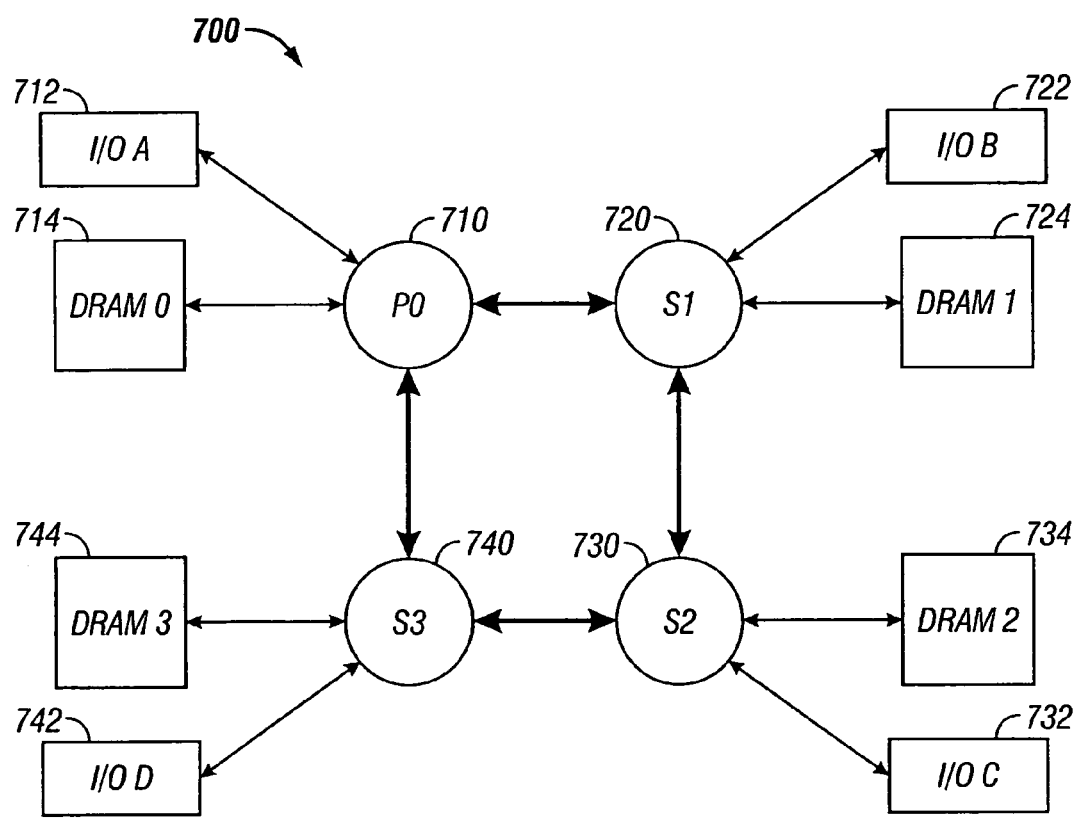
FIG. 7 illustrates a block diagram of a multiprocessor computer system using the processor surrogate of FIG. 6 according to yet another aspect of the present invention.

FIG. 7 illustrates a block diagram of a multiprocessor computer system 700 using the processor surrogate of FIG. 6 according to yet another aspect of the present invention. System 700 illustrates the flexibility of the active form of the processor surrogate in constructing complex system topologies having significant upgrade capabilities. System 700 includes four processing nodes labeled "P0", "S1", "S2", and "S3" implemented by an actual processor 710 and processor surrogates 720, 730, and 740, respectively. System 700 uses an actual processor such as processor 110 of FIG. 2 for P0, and active forms of processor surrogates such as processor surrogate 520 shown in FIG. 6 for nodes S1, S2, and S3. The processor nodes are connected in a ring using coherent HyperTransport links such that node P0 is connected to adjacent nodes S1 and S3, node S1 is connected to adjacent nodes P0 and S2, node S2 is connected to adjacent nodes S1 and S3, and node S3 is connected to adjacent nodes S2 and P0.

System 700 provides accessibility to DRAM and I/O devices connected to three active processor surrogates but without the need for additional CPUs required by actual processors. It also provides a significant upgrade path in the ability to expand the system to up to four processors.

In other systems other processor node topologies may be used and all such multiprocessor topologies may be populated with at least one actual processor and one or more processor surrogates to provide flexible upgrade paths. In addition note that while processor 110 of FIG. 2 supports communication over three HyperTransport links using three corresponding link controllers, in other embodiments an actual processor may include a different number of link controllers and the possibilities for use of processor surrogates vary as well. For example if actual processor 110 included four link controllers, a passive form of the processor surrogate could allow connection of processor 110 to two extra I/O devices connected to the processor surrogate in a two-node multiprocessor system. The availability of four link controllers also allows more complex network topologies that those specifically illustrated herein.

Note that the embodiments of the processor surrogate and multiprocessor systems were described herein in the context of a HyperTransport NUMA architecture. In other embodiments other inter-processor communication protocols may also be used. Furthermore note the inter-processor communication protocol need not be implemented using coherent links. For example software coherence management could be used with non-coherent inter-processor communication links. Moreover the disclosed microprocessor may implement other instruction sets than the x86 instruction set.

Figure 8:
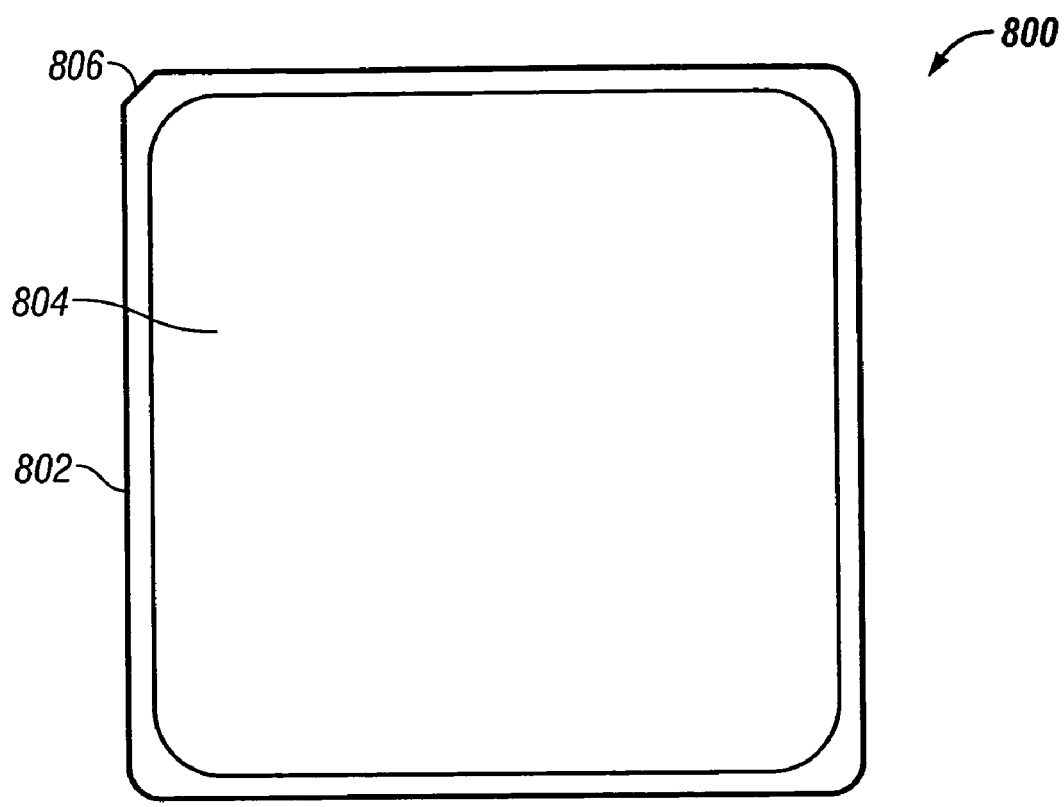
FIG. 8 illustrates a top view of an integrated circuit package that may be used for the actual processor of FIG. 2 and the processor surrogates of FIGS. 4 and 6.

FIG. 8 illustrates a top view 800 of an integrated circuit package that may be used for actual processor 110 of FIG. 2 and for processor surrogate 320 of FIG. 4 and processor surrogate 520 of FIG. 6. The exemplary integrated circuit package is a micro pin grid array package. The pin grid array package is a package type that is especially well suited for replacement because it can be matched with a corresponding socket, and the processor surrogate can be easily extracted from it and replaced with an actual processor. From top view 800 it can be seen that the micro pin grid array package has a base portion 802 and a lid portion 804 within a central portion of the area defined by base portion 802. Base portion 802 has a bevel 806 in the upper right corner signifying the "A1" corner, as will be described more fully below.

Figure 9:
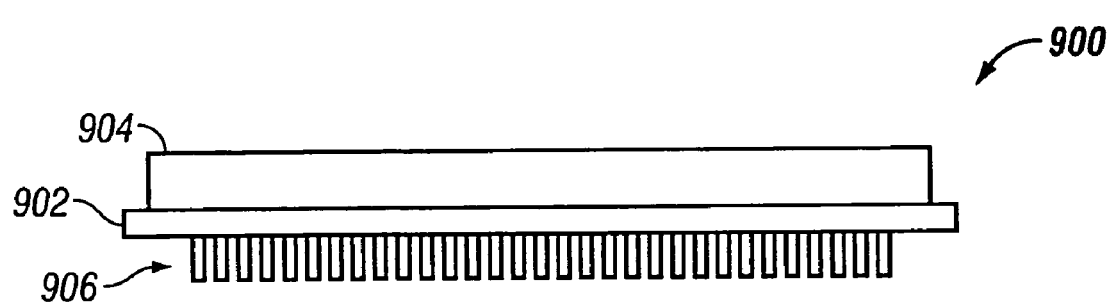
FIG. 9 illustrates a side view of the integrated circuit package of FIG. 8.

FIG. 9 illustrates a side view 900 of the integrated circuit package of FIG. 8. From side view 900 is seen base portion 902 and lid 904. Beneath base portion 902 is a plurality of integrated circuit terminals in the form of an array of pins 906 extending downward from the bottom surface of base 902.

Figure 10:
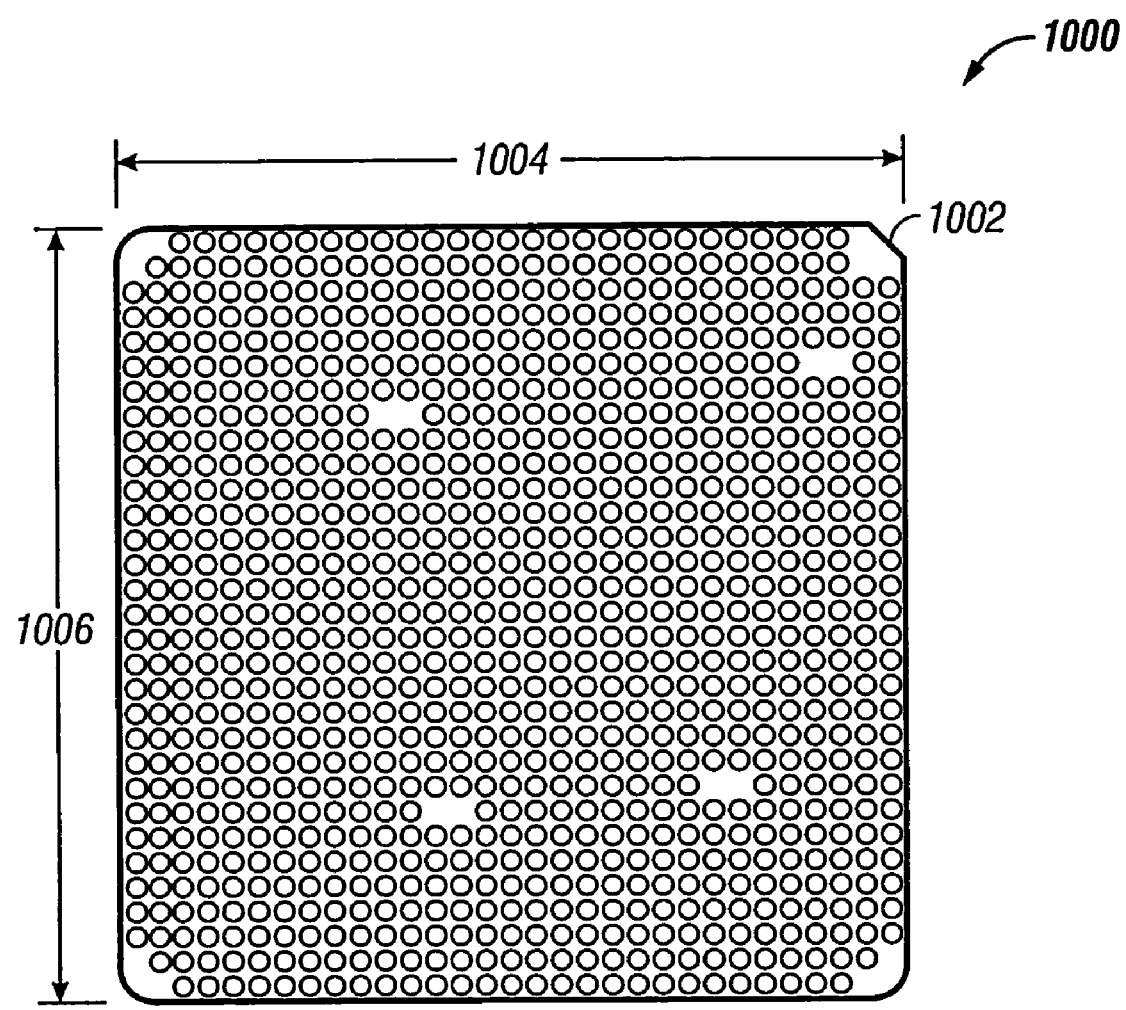
FIG. 10 illustrates a bottom view of the integrated circuit package of FIG. 8.

FIG. 10 illustrates a bottom view 1000 of the integrated circuit package of FIG. 8. From bottom view 1000 is seen A1 corner 1002 and an array of pins extending toward the viewer represented by solid circles. The package outlines a possible array of pins formed by columns 1004 and rows 1006. Rows 1004 include 31 rows and columns 1006 include 31 columns for a potential array of 961 pins. However, pins are not present in the corners and in several areas within the array so that the total number of pins is equal to 940. The rows are assigned letters in the sequence A, B, C . . . H, J . . . M, N, P, R, S . . . V, W, Y, AA, AB . . . AH, AJ, AK, AL from top to bottom and the columns are numbered from 1 to 31 from right to left.

Thus in one specific example, a normal processor has a pin assignment including the following pertinent pin assignments shown in TABLE I for link controller 212 and in TABLE II for link controller 214:

TABLE I

| Pin Name | Location | Pin Name | Location | Pin Name | Location |
| --- | --- | --- | --- | --- | --- |
| L0_CADIN_L[0] | G2 | L0_CADOUT_L[0] | AE1 | L0_CLKIN_L[0] | L2 |
| L0_CADIN_L[1] | H1 | L0_CADOUT_L[1] | AE3 | L0_CLKIN_L[1] | M5 |
| L0_CADIN_L[2] | J2 | L0_CADOUT_L[2] | AC1 | L0_CLKIN_H[0] | L3 |
| L0_CADIN_L[3] | K1 | L0_CADOUT_L[3] | AC3 | L0_CLKIN_H[1] | L5 |
| L0_CADIN_L[4] | M1 | L0_CADOUT_L[4] | AA3 | L0_CLKOUT_L[0] | AA1 |
| L0_CADIN_L[5] | N2 | L0_CADOUT_L[5] | W1 | L0_CLKOUT_L[1] | AB3 |
| L0_CADIN_L[6] | P1 | L0_CADOUT_L[6] | W3 | L0_CLKOUT_H[0] | AB1 |
| L0_CADIN_L[7] | R2 | L0_CADOUT_L[7] | U1 | L0_CLKOUT_H[1] | AB4 |
| L0_CADIN_L[8] | H5 | L0_CADOUT_L[8] | AF3 | L0_CTLIN_L[0] | T1 |
| L0_CADIN_L[9] | H4 | L0_CADOUT_L[9] | AE5 | L0_CTLIN_H[0] | R1 |
| L0_CADIN_L[10] | K5 | L0_CADOUT_L[10] | AD3 | L0_CTLOUT_L[0] | U3 |
| L0_CADIN_L[11] | K4 | L0_CADOUT_L[11] | AC5 | L0_CTLOUT_L[0] | U2 |
| L0_CADIN_L[12] | M4 | L0_CADOUT_L[12] | AA5 | | |
| L0_CADIN_L[13] | P5 | L0_CADOUT_L[13] | Y3 | | |
| L0_CADIN_L[14] | P4 | L0_CADOUT_L[14] | W5 | | |
| L0_CADIN_L[15] | T5 | L0_CADOUT_L[15] | V3 | | |
| L0_CADIN_H[0] | G3 | L0_CADOUT_H[0] | AF1 | | |
| L0_CADIN_H[1] | G1 | L0_CADOUT_H[1] | AE2 | | |
| L0_CADIN_H[2] | J3 | L0_CADOUT_H[2] | AD1 | | |
| L0_CADIN_H[3] | J1 | L0_CADOUT_H[3] | AC2 | | |
| L0_CADIN_H[4] | L1 | L0_CADOUT_H[4] | AA2 | | |
| L0_CADIN_H[5] | N3 | L0_CADOUT_H[5] | Y1 | | |

TABLE I-continued

| Pin Name | Location | Pin Name | Location | Pin Name | Location |
|---|---|---|---|---|---|
| L0_CADIN_H[6] | N1 | L0_CADOUT_H[6] | W2 | | |
| L0_CADIN_H[7] | R3 | L0_CADOUT_H[7] | V1 | | |
| L0_CADIN_H[8] | G5 | L0_CADOUT_H[8] | AF4 | | |
| L0_CADIN_H[9] | H3 | L0_CADOUT_H[9] | AF5 | | |
| L0_CADIN_H[10] | J5 | L0_CADOUT_H[10] | AD4 | | |
| L0_CADIN_H[11] | K3 | L0_CADOUT_H[11] | AD5 | | |
| L0_CADIN_H[12] | M3 | L0_CADOUT_H[12] | AB5 | | |
| L0_CADIN_H[13] | N5 | L0_CADOUT_H[13] | Y4 | | |
| L0_CADIN_H[14] | P3 | L0_CADOUT_H[14] | Y5 | | |
| L0_CADIN_H[15] | R5 | L0_CADOUT_H[15] | V4 | | |

TABLE II

| Pin Name | Location | Pin Name | Location | Pin Name | Location |
|---|---|---|---|---|---|
| L1_CADIN_L[0] | B22 | L1_CADOUT_L[0] | A4 | L1_CLKIN_L[0] | B18 |
| L1_CADIN_L[1] | A21 | L1_CADOUT_L[1] | C4 | L1_CLKIN_L[1] | E17 |
| L1_CADIN_L[2] | B20 | L1_CADOUT_L[2] | A6 | L1_CLKIN_H[0] | C18 |
| L1_CADIN_L[3] | A19 | L1_CADOUT_L[3] | C6 | L1_CLKIN_H[1] | E18 |
| L1_CADIN_L[4] | A17 | L1_CADOUT_L[4] | C8 | L1_CLKOUT_L[0] | A8 |
| L1_CADIN_L[5] | B16 | L1_CADOUT_L[5] | A10 | L1_CLKOUT_L[1] | C7 |
| L1_CADIN_L[6] | A15 | L1_CADOUT_L[6] | C10 | L1_CLKOUT_H[0] | A7 |
| L1_CADIN_L[7] | B14 | L1_CADOUT_L[7] | A12 | L1_CLKOUT_H[1] | D7 |
| L1_CADIN_L[8] | E21 | L1_CADOUT_L[8] | C3 | L1_CTLIN_L[0] | A13 |
| L1_CADIN_L[9] | D21 | L1_CADOUT_L[9] | E4 | L1_CTLIN_H[0] | A14 |
| L1_CADIN_L[10] | E19 | L1_CADOUT_L[10] | C5 | L1_CTLOUT_L[0] | C12 |
| L1_CADIN_L[11] | D19 | L1_CADOUT_L[11] | E6 | L1_CTLOUT_L[0] | B12 |
| L1_CADIN_L[12] | D17 | L1_CADOUT_L[12] | E8 | | |
| L1_CADIN_L[13] | E15 | L1_CADOUT_L[13] | C9 | | |
| L1_CADIN_L[14] | D15 | L1_CADOUT_L[14] | E10 | | |
| L1_CADIN_L[15] | E13 | L1_CADOUT_L[15] | C11 | | |
| L1_CADIN_H[0] | C22 | L1_CADOUT_H[0] | A3 | | |
| L1_CADIN_H[1] | A22 | L1_CADOUT_H[1] | B4 | | |
| L1_CADIN_H[2] | C20 | L1_CADOUT_H[2] | A5 | | |
| L1_CADIN_H[3] | A20 | L1_CADOUT_H[3] | B6 | | |
| L1_CADIN_H[4] | A18 | L1_CADOUT_H[4] | B8 | | |
| L1_CADIN_H[5] | C16 | L1_CADOUT_H[5] | A9 | | |
| L1_CADIN_H[6] | A16 | L1_CADOUT_H[6] | B10 | | |
| L1_CADIN_H[7] | C14 | L1_CADOUT_H[7] | A11 | | |
| L1_CADIN_H[8] | E22 | L1_CADOUT_H[8] | D3 | | |
| L1_CADIN_H[9] | C21 | L1_CADOUT_H[9] | E3 | | |
| L1_CADIN_H[10] | E20 | L1_CADOUT_H[10] | D5 | | |
| L1_CADIN_H[11] | C19 | L1_CADOUT_H[11] | E5 | | |
| L1_CADIN_H[12] | C17 | L1_CADOUT_H[12] | E7 | | |
| L1_CADIN_H[13] | E16 | L1_CADOUT_H[13] | D9 | | |
| L1_CADIN_H[14] | C15 | L1_CADOUT_H[14] | E9 | | |
| L1_CADIN_H[15] | E14 | L1_CADOUT_H[15] | D11 | | | in which pin L0_CADIN_H[0] represents the high or more-positive pin of a differential pair of pins for control/address/data input pin 0 for link controller 0, L1_CLKOUT_L[1] represents the low or more-negative pin of the differential pair of pins for clock output pin 1 for link controller 1, and so on.

In order to make a passive form of the processor surrogate as shown in FIG. 4, one would need to internally connect the input terminals of link controller 0 to the corresponding output terminals of link controller 1, and the input terminals of like controller 1 to the corresponding output terminals of link controller 0. Thus, using the micro pin grid array example of FIGS. 8–10 and TABLEs I and II, pin L0_CADIN_L[0] (assigned to pin location G2) would be connected to pin L1_CADOUT_L[0] (assigned to pin location A4), pin L1_CADIN_H[15] (assigned to pin location E14) would be connected to pin L0_CADOUT_H[15] (assigned to pin location V4), and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A processor surrogate for use in a processing node of a multiprocessor data processing system having a plurality of processing nodes coupled together and to a plurality of input/output devices using corresponding communication links, the processor surrogate comprising:

a first port comprising a first set of integrated circuit terminals adapted to be coupled to a first external communication link for coupling to one of the plurality of processing nodes;

a second port comprising a second set of integrated circuit terminals adapted to be coupled to a second external communication link for coupling to one of the plurality of input/output devices; and an interconnection circuit coupled between said first port and said second port;

wherein the processor surrogate is characterized as not having its own central processing unit.

2. The processor surrogate of claim 1 wherein said interconnection circuit comprises a passive interconnection between said first port and said second port.

3. The processor surrogate of claim 2 wherein said interconnection circuit further comprises:

a first set of internal connections between a plurality of input terminals of said first port and a corresponding plurality of output terminals of said second port; and a second set of internal connections between a plurality of input terminals of said second port and a corresponding plurality of output terminals of said first port.

4. The processor surrogate of claim 1 wherein said interconnection circuit comprises an active interconnection between said first port and said second port.

5. The processor surrogate of claim 4 wherein said interconnection circuit further comprises:

a first communication link controller coupled to said first port;

a second communication link controller coupled to said second port; and a crossbar switch having a first terminal coupled to said first communication link controller, and a second terminal coupled to said second communication link controller.

6. The processor surrogate of claim 5 wherein said interconnection circuit further comprises:

a memory controller coupled to said crossbar switch and adapted to be coupled to an external memory, for controlling accesses between said first and second communication link controllers and said external memory.

7. The processor surrogate of claim 5 wherein said first and second communication link controllers are substantially compatible with the HyperTransport™ I/O Link Specification, Revision 1.05.

8. The processor surrogate of claim 7 wherein said first communication link controller implements a coherent form of the HyperTransport™ I/O Link Specification, Revision 1.05.

9. A processor surrogate for use in a multiprocessor data processing system having a first processing node including an actual processor and a second processing node coupled to the first processing node and including the processor surrogate, the processor surrogate comprising:

an integrated circuit package having a first plurality of terminals forming a first port of the processor surrogate and disposed at locations corresponding to a first link controller of the actual processor, and a second plurality of terminals forming a second port of the processor surrogate and disposed at locations corresponding to a second link controller of the actual processor; and a plurality of electrical connections between said first plurality of terminals of said first port and corresponding ones of said second plurality of terminals of said second port;

wherein the processor surrogate is characterized as not having its own central processing unit.

10. The processor surrogate of claim 9 wherein said plurality of electrical connections comprises:

a first set of internal connections between a plurality of input terminals of said first port and a corresponding plurality of output terminals of said second port; and a second set of internal connections between a plurality of input terminals of said second port and a corresponding plurality of output terminals of said first port.

11. The processor surrogate of claim 9 wherein said first and second link controllers of the actual processor are substantially compatible with the HyperTransport™ I/O Link Specification, Revision 1.05.

12. The processor surrogate of claim 9 wherein the multiprocessor data processing system further comprises an input/output device coupled to said second port of the processor surrogate.

13. A processor surrogate for use in a multiprocessor data processing system having a plurality of processing nodes comprising a first processing node including an actual processor and a second processing node coupled to the first processing node and including the processor surrogate, the processor surrogate comprising:

a first port comprising a first set of integrated circuit terminals adapted to be coupled to a first external communication link and thereby to one of the plurality of processing nodes;

a second port comprising a second set of integrated circuit terminals adapted to be coupled to a second external communication link and thereby to an input/output device; and an active interconnection circuit coupled between said first port and said second port to thereby couple said one of the plurality of processing nodes and said input/output device;

wherein the processor surrogate is characterized as not having its own central processing unit.

14. The processor surrogate of claim 13 wherein said one of the plurality of processing nodes comprises said first node including said actual processor.

15. The processor surrogate of claim 13 wherein said active interconnection circuit comprises:

a first communication link controller coupled to said first port;

a second communication link controller coupled to said second port; and a crossbar switch having a first terminal coupled to said first communication link controller, and a second terminal coupled to said second communication link controller.

16. The processor surrogate of claim 15 further comprising:

a memory controller coupled to said crossbar switch and adapted to be coupled to an external memory, for controlling accesses between said first and second communication link controllers and said external memory.

17. The processor surrogate of claim 15 wherein said first and second communication link controllers are substantially compatible with the HyperTransport™ I/O Link Specification, Revision 1.05.

18. The processor surrogate of claim 17 wherein said first communication link controller implements a coherent form of the HyperTransport™ I/O Link Specification, Revision 1.05.

19. The processor surrogate of claim 13 further comprising:
a third port comprising a third set of integrated circuit terminals coupled to said active interconnection circuit and adapted to be coupled to a third external communication link and thereby to a second input/output device.

20. A multiprocessor data processing system comprising:
a first processing node comprising an actual processor;
a second processing node comprising a processor surrogate having an integrated circuit package and a first port coupled to said first processing node, a second port, and an interconnection circuit coupled between said first port and said second port, wherein the processor surrogate is characterized as not having its own central processing unit; and
an input/output device coupled to said second port of said second processing node and accessible to said actual processor via said processor surrogate.

21. The multiprocessor data processing system of claim 20 wherein said interconnection circuit comprises a passive interconnection between said first port and said second port.

22. The multiprocessor data processing system of claim 21 wherein said interconnection circuit further comprises:
a first set of internal connections between a plurality of input terminals of said first port and a corresponding plurality of output terminals of said second port; and
a second set of internal connections between a plurality of input terminals of said second port and a corresponding plurality of output terminals of said first port.

23. The multiprocessor data processing system of claim 20 wherein said interconnection circuit comprises an active interconnection between said first port and said second port.

24. The multiprocessor data processing system of claim 23 wherein said interconnection circuit further comprises:
a first communication link controller coupled to said first port;
a second communication link controller coupled to said second port; and
a crossbar switch having a first terminal coupled to said first communication link controller, and a second terminal coupled to said second communication link controller.

25. The multiprocessor data processing system of claim 24 wherein said first and second communication link controllers are substantially compatible with the HyperTransport™ I/O Link Specification, Revision 1.05.

26. The multiprocessor data processing system of claim 24 wherein said first communication link controller implements a coherent form of the HyperTransport™ I/O Link Specification, Revision 1.05.

27. The multiprocessor data processing system of claim 24 further comprising:
a memory controller coupled to said crossbar switch and adapted to be coupled to an external memory, for controlling accesses between said first and second communication link controllers and said external memory.

28. A multiprocessor data processing system comprising:
a first processing node comprising an actual processor;
a second processing node comprising a first processor surrogate having a first port coupled to said first processing node, a second port, a third port, and an interconnection circuit coupled between said first port, said second port, and said third port, wherein the processor surrogate is characterized as not having its own central processing unit;
a third processing node coupled to said third port of said first processor surrogate in said second processing node;
a fourth processing node coupled to said third processing node and to said first processing node; and
a first input/output device coupled to said second port of said second processing node and accessible to said actual processor via said first processor surrogate.

29. The multiprocessor data processing system of claim 28 wherein said third processing node comprises a second processor surrogate having a first port coupled to said third port of said first processor surrogate in said second processing node, a second port, a third port coupled to said fourth processing node, and an interconnection circuit coupled between said first port, said second port, and said third port thereof.

30. The multiprocessor data processing system of claim 29 further comprising:
a second input/output device coupled to said second port of said second processor surrogate and accessible to said actual processor via said first processor surrogate and said second processor surrogate.

31. The multiprocessor data processing system of claim 30 wherein said fourth processing node comprises a third processor surrogate having a first port coupled to said third processing node, a second port, a third port coupled to said first processing node, and an interconnection circuit coupled between said first port, said second port, and said third port thereof.

32. The multiprocessor data processing system of claim 31 further comprising:
a third input/output device coupled to said second port of said third processor surrogate and accessible to said actual processor via said third processor surrogate.

* * * * *